(No Model.)
T. L. WALLACE.
SAW.
No. 597,229. Patented Jan. 11, 1898.
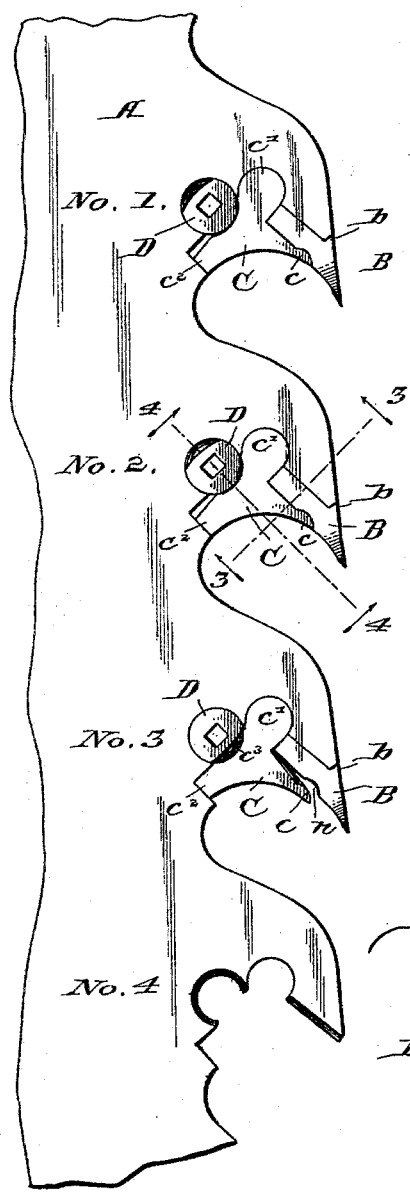
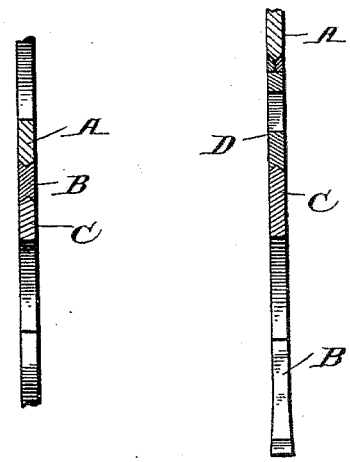
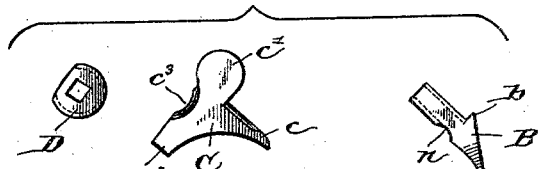
WITNESSES:
INVENTOR
Thomas L. Wallace,
BY Chester Bradford,
ATTORNEY.

UNITED STATES PATENT OFFICE.

THOMAS L. WALLACE, OF INDIANAPOLIS, INDIANA, ASSIGNOR TO THE E. C. ATKINS & COMPANY, OF SAME PLACE.

SAW.

SPECIFICATION forming part of Letters Patent No. 597,229, dated January 11, 1898.

Application filed November 20, 1896. Serial No. 612,806. (No model.)

*To all whom it may concern:*

Be it known that I, THOMAS L. WALLACE, a citizen of the United States, residing at Indianapolis, in the county of Marion and State of Indiana, have invented certain new and useful Improvements in Saws, of which the following is a specification.

My present invention relates to inserted-tooth saws; and it consists in a certain construction and arrangement of parts whereby the teeth are locked firmly in position, while the locking devices are so constructed as to be capable of repeated use as the cutting bits or teeth are worn out and have to be replaced.

Referring to the accompanying drawings, which are made a part hereof and on which similar letters of reference indicate similar parts, Figure 1 is a side elevation of a fragment of a saw-blade containing teeth and holding devices embodying my improvements; Fig. 2, a view of the tooth or bit and the parts of the locking device distributed or separate from each other; Fig. 3, a detail sectional view, on an enlarged scale, as seen when looking in the direction indicated by the arrows from the dotted line 3 3 in Fig. 1; and Fig. 4, a similar view as seen when looking in the direction indicated by the arrows from the dotted line 4 4 in Fig. 1.

In said drawings the portions marked A represent the saw-blade; B, the cutting bit or tooth; C, the clamping device whereby said teeth are held in position, and D revoluble cams whereby the clamps C can be operated.

The saw-blade is shown as a fragment of the blade of a straight saw, such as a band-saw. Obviously, however, the invention may be applied to any form of saws desired, such as circular saws. This saw blade or plate is only peculiar in having cut therein the various recesses which are necessary to accommodate the designed cutting-teeth and their clamping and holding devices. As will be observed, the recesses which receive the rounded portion of the clamps C and which receive the cams D are each somewhat more than a half-circle in order that said parts may be firmly retained therein, as will be readily understood.

The teeth or bits B are not in themselves much dissimilar from the corresponding bits or teeth used with some other forms of fastenings. As shown most plainly in Fig. 3, the edges are V-shaped, so that the teeth will be well retained in place, and each tooth preferably has a shoulder $b$, which comes against a correspondingly-squared end adjacent thereto in the saw-blade and assists in supporting the tooth against the thrust occasioned by the work. On the other side these teeth have preferably concave notches $n$, (see Fig. 2,) into which corresponding projections on the clamps C enter and which serve to hold said teeth from being thrown out of place by the momentum of the saw.

The clamps C are of the form plainly shown in the drawings and are adapted to be placed in the throats of the saw under the teeth and engage and hold said teeth in place. One projection $c$ engages with the notches $n$ in the teeth and the rounded ends $c'$ engage with the corresponding openings in the saw-blade, while the squared end $c^2$ rests against a corresponding shoulder in the saw-blade. On the back side these clamps are curved and are A-shaped, as at $c^3$, and at this end the cams D come in contact therewith, as will be understood and as will be presently more fully explained.

The cams D are round disks having squared central openings, and which are V-shaped on their peripheries, one side being flattened to form the cam, as shown most plainly in Fig. 2. They are inserted within the recesses formed therefor in the saw-plate, this being permitted by reason of the flattened side, notwithstanding said recesses are somewhat more than half-circular in form, so that the largest diameter thereof is beyond the entrance-point. When these cams are first placed in position, they are turned so that their flattened side is outward, as shown at No. 3 in Fig. 1. The clamps C are then put in place and the teeth B inserted, after which the cams D are turned to the positions shown at Nos. 1 and 2, thus forcing the clamps C around against the teeth and locking them firmly in position. When it is desired to remove a tooth, it can be easily done by revolving the cams D back to the position shown at No. 3, when the clamps C will recede from contact with the teeth B, after which, of course, they may be easily removed. The locking and unlocking of the teeth is thus accomplished by merely revolving the cams D, as has been explained. By this arrangement of parts the strain of the clamp is upward against the portion of the blade between the throats of the teeth and does not in any manner disturb the tension of the blade as a whole. This is of great importance, in band-saws particularly, as variations in the tension at different points in the blade are liable to produce cracks and destroy the very expensive blades.

Having thus fully described my said invention, what I claim as new, and desire to secure by Letters Patent, is—

The combination, in a saw, of the blade-containing recesses for the insertion of the teeth and retaining-clamps, said recesses each being formed on one side of the throat under each tooth and with a straight wall for a suitable distance from the outside to serve as a rest for one side of the tooth, a circular portion beneath said straight part to serve as the clamp-seat, another circular portion below said clamp-seat to serve as the seat for the rotary operating-cam, and terminating at its lower end in a support for the lower end of the clamp, said clamp formed with a circular part mounted in the aforesaid seat provided therefor in said recess, with an upwardly-extending arm which forms the other side of the tooth-socket and is adapted to clamp and secure said tooth, its other end extending to rest in the support provided therefor in the lower end of said recess, said rotary cam mounted in its seat in said recess and adapted to operate against the under side of said clamp to secure or release said tooth, said several parts being formed with engaging edges, all substantially as set forth.

In witness whereof I have hereunto set my hand and seal, at Indianapolis, Indiana, this 14th day of November, A. D. 1896.

THOMAS L. WALLACE. [L. S.]

Witnesses:
  CHESTER BRADFORD,
  JAMES A. WALSH.